March 26, 1957   M. J. POGGIO   2,786,708
UTENSIL LIFTER
Filed June 15, 1953

INVENTOR.
Mario J. Poggio
BY A. Schapp
Att'y

United States Patent Office 2,786,708
Patented Mar. 26, 1957

2,786,708
UTENSIL LIFTER

Mario J. Poggio, San Pablo, Calif.

Application June 15, 1953, Serial No. 361,579

2 Claims. (Cl. 294—34)

The present invention relates to improvements in utensil lifters, and has particular reference to devices for lifting kitchen utensils having a rim around the same, such as pie pans, sauce pans, cake pans and the like, the principal object of the invention being to provide a lifter of the character described which may be readily engaged and clamped upon the rim of a pan at circumferentially spaced points for securely holding the pan.

A further object of the invention is to provide a lifter of the character described which may be readily adjusted to pans of different sizes and allows of ample clearance over the pan to accommodate, for instance, a heavy pie crust bulging over the rim of the pan, without crushing the same.

A still further object of my invention is to provide a lifter which is simple in construction, consisting essentially of three parts only, inexpensive to manufacture, and easy to manipulate so that hot pans may be readily lifted from the stove or an oven without danger of burning the operator's hands.

Further objects and advantages of my invention will be disclosed as the specification continues, and the new and useful features of the invention will be fully defined in the claims attached hereto.

Figure 1:
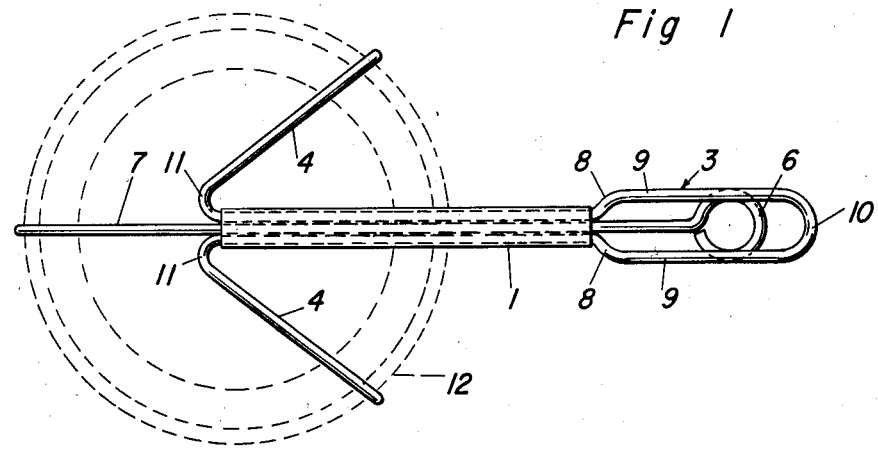
Figure 2:
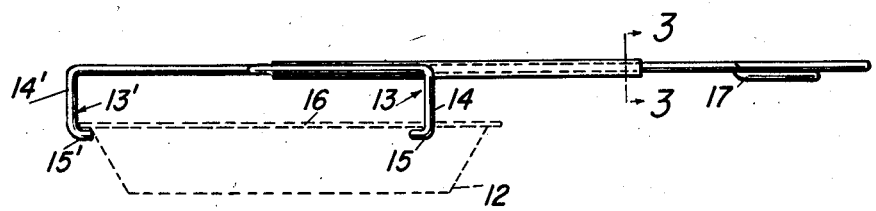

The preferred form of my invention is illustrated in the accompanying drawing, forming part of this application, in which:

Figure 1 shows a plan view of my utensil lifter, as applied to a pie pan;

Figure 2, a side view of the same; and

Figure 3:
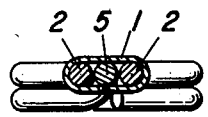

Figure 3, a section taken along line 3—3 of Figure 2.

While I have shown only the preferred form of my invention, it should be understood that various changes or modifications may be made within the scope of the claims attached hereto without departing from the spirit of the invention.

Referring to the drawing in detail, my utensil lifter comprises in its principal features, a flattened shell 1, a pair of rods 2 accommodated in the sides thereof and forming a loop 3 at the rear end of the shell and gripping arms 4 at the front end of the shell, and a single rod 5 slidable in the shell between the rods 2 and having a finger hold 6 slidable on the loop 3 and a gripping arm 7 projecting straight forward from the forward end of the shell.

The shell 1 is of considerable length, say about eight inches, straight, and tubular in cross section. It is dimensioned to accommodate the three rods 2, 5 and 2 in side-by-side relation, the rods being again dimensioned to substantially fill the shell, and to be in relatively close contact with one another.

The two rods 2, at the rear end of the shell, form the loop 3, the rods spreading apart at their points of emergence from the shell, as at 8, then continuing rearwardly, in parallel strands 9 and coming together, at their rear ends, in a semi-circular arc, as shown at 10.

Where the two rods emerge forwardly of the front end of the shell, they are bent backward, as at 11, at acute angles to the shell, to form arms 4 which run approximately radially with respect to the pie pan, indicated at 12.

The arms terminate, at their free ends, in gripping fingers 13 comprising downwardly projecting rod sections 14, and inwardly projecting spurs 15 adapted to catch underneath the rim 16 of the pie pan.

The rod sections 14 are made of substantial length to allow of ample clearance of the body portion of the lifter over the pie pan for accommodating a pie crust bulging outwardly of the pan. The spurs are made to run parallel to the arms 14 so as to occupy a substantially radial position with respect to the pie pan and to substantially point toward the central region of the latter.

The two rods 2 are held rigidly in the shell by a close fit and are furthermore held against endwise motion by the spreading sections 8 at one end of the shell and the bends 11 at the other end of the shell.

While I have referred to the two rods, it will be readily understood that the rods 2, the loop 3, the arms 4 and their gripping elements may be readily fashioned out of a single rod by simple bending operations, and may be made to form a unitary structure.

The rod 5 is slidable in the shell between the two rods 2 and is formed, at its rear end, with a ring-shaped finger hold 6, which is slightly off-set, as at 17, to run parallel to the loop and to ride against the bottom face of the latter, the width of the finger hold being the same as that of the loop.

The free end of the rod 5 projects straight forward from the front end of the shell, as at 7, and terminates in a gripping finger 13' comprising a downwardly projecting rod section 14' and an inturned spur 15', the gripping finger being of the same shape and dimensions as the gripping fingers 13.

The rod 5 has a sliding fit in the shell between the rods 2, being sufficiently loose for easy operation by the finger hold 6, and sufficiently tight to stay in any position to which it has been adjusted.

In operation, the user grips the loop 3 in her hand, places the forefinger in the finger grip 6, and pushes the latter forward to the front end of the loop.

She then guides the lifting device over the pie pan in slightly inclined position, until the gripping fingers 13 engage over the rim of the pie pan, tilts the forward end downward to bring the spur 15' on a level below the rim of the pie pan and retracts the finger hold 6 until all the gripping fingers are firmly clamped upon the rim of the pie pan.

The latter may now readily be lifted without any danger of contact with the hot pie pan by the hands of the operator.

I claim:

1. A lifter for a pie pan or the like, comprising an elongated, straight and flattened tubular shell of uniform cross-section having a pair of straight and parallel rods mounted rigidly in the sides thereof, the rods forming a flat loop at the rear end of the shell and having free ends bent backwards at the front end of the shell at acute angles and substantially in radial relation to the central region of a pie pan engaged by said ends, a third rod slidable in the shell between the first two rods, the shell and the first two rods coacting to bind the third rod and to thus frictionally restrain its relative movement, the third rod having a finger hold at the rear end of the shell slidable against the loop to prevent rotation of the third rod, the latter rod having a free end projecting straight forward from the forward end of the shell and disposed in radial relation with respect to said central section, and gripping fingers at the free ends of the rods and cooperable to engage underneath the rim of the pie pan at symmetrically spaced points and to be clamped thereon by a retracting movement of the finger hold.

2. A lifter for a pie pan or the like, comprising a rod bent midway the length thereof to form two strands, the two strands being spaced adjacent the bend to form a relatively wide hand hold, and having more closely related parallel intermediate stretches terminating in arms turned outward and backward, with gripping fingers at the ends of the arms, a second rod slidable between the intermediate stretches and having a finger hold slidable on the hand hold, with the free end of the second rod projecting straight forward beyond said intermediate stretches and having a gripping finger at the free end thereof, and a straight, tubular shell of uniform cross-section surrounding the intermediate stretches and the second rod and having two stretches of the first rod clamped therein, the second rod being in frictional engagement with said two stretches to yieldingly resist sliding movement of said rod, and the finger hold being made to lie flat and non-rotatably against the hand hold for holding the second rod against turning movement with respect to the first rod.

References Cited in the file of this patent

UNITED STATES PATENTS

| | | |
|---|---|---|
| 561,969 | Craig | June 16, 1896 |
| 649,723 | Fischer et al. | May 15, 1900 |
| 1,435,405 | Lockman et al. | Nov. 14, 1922 |
| 1,964,392 | Thomas | June 26, 1934 |
| 2,187,145 | Brown | Jan. 16, 1940 |